(12) United States Patent
Li et al.

(10) Patent No.: US 11,898,699 B2
(45) Date of Patent: Feb. 13, 2024

(54) OIL MIST RECOVERY, SEPARATION AND PURIFICATION DEVICE FOR MINIMUM QUANTITY LUBRICANT GRINDING PROCESS

(71) Applicants: QINGDAO UNIVERSITY OF TECHNOLOGY, Shandong (CN); SHANGHAI JINZHAO ENERGY SAVING TECHNOLOGY CO., LTD., Shanghai (CN)

(72) Inventors: Changhe Li, Qingdao (CN); Zhenjing Duan, Qingdao (CN); Huajun Cao, Qingdao (CN); Xuefeng Xu, Qingdao (CN); Naiqing Zhang, Qingdao (CN); Lan Dong, Qingdao (CN); Yanbin Zhang, Qingdao (CN); Xiufang Bai, Qingdao (CN); Wentao Wu, Shandong (CN); Teng Gao, Qingdao (CN); Min Yang, Qingdao (CN); Dongzhou Jia, Qingdao (CN); Runze Li, Qingdao (CN); Yali Hou, Qingdao (CN)

(73) Assignees: QINGDAO UNIVERSITY OF TECHNOLOGY, Shandong (CN); SHANGHAI JINZHAO ENERGY SAVING TECHNOLOGY CO., LTD., Shanghai (CN)

( * ) Notice: Subject to any disclaimer, the term of this patent is extended or adjusted under 35 U.S.C. 154(b) by 462 days.

(21) Appl. No.: 17/279,491

(22) PCT Filed: Feb. 6, 2020

(86) PCT No.: PCT/CN2020/074390
§ 371 (c)(1),
(2) Date: Mar. 24, 2021

(87) PCT Pub. No.: WO2020/156583
PCT Pub. Date: Aug. 6, 2020

(65) Prior Publication Data
US 2021/0387300 A1   Dec. 16, 2021

(30) Foreign Application Priority Data
Jan. 31, 2019   (CN) .......................... 201910100369.2

(51) Int. Cl.
*F16N 7/32* (2006.01)
*B23Q 11/10* (2006.01)
(Continued)

(52) U.S. Cl.
CPC ............ *F16N 7/32* (2013.01); *B23Q 11/1046* (2013.01); *B23Q 11/1069* (2013.01);
(Continued)

(58) Field of Classification Search
CPC ... F16N 7/32; B23Q 11/1046; B23Q 11/1069; B24B 55/12; B01D 45/16; B01D 50/20;
(Continued)

(56) References Cited

U.S. PATENT DOCUMENTS

| | | | | |
|---|---|---|---|---|
| 1,982,639 A | * | 12/1934 | Christofferson | ....... B01D 46/18 55/354 |
| 2,722,993 A | * | 11/1955 | Gerber | .................. A47L 9/1427 206/820 |

(Continued)

FOREIGN PATENT DOCUMENTS

| CN | 1773196 A | 5/2006 |
|---|---|---|
| CN | 104406030 A | 3/2015 |

(Continued)

OTHER PUBLICATIONS

Apr. 26, 2020 Search Report issued in Intenational Patent Application No. PCT/CN2020/074390.
(Continued)

*Primary Examiner* — Stephen Hobson

(74) *Attorney, Agent, or Firm* — True Shepherd LLC; Andrew C. Cheng

(57) ABSTRACT

An oil mist recovery, separation and purification device for a minimum quantity lubricant (MQL) grinding process, including: a pneumatic separation mechanism, a pipeline and a fan fixedly connected with one end of the pipeline, wherein the fan is configured to form a negative pressure in the pipeline, one cone-shaped filter mesh mechanism is disposed in the pipeline, and a tip of the cone-shaped filter mesh mechanism faces the side of an air inlet direction of the pipeline; and a filtering and recovery mechanism connected with the pipeline and including a case body, a filtering mechanism and a recovery mechanism, wherein the case body is connected with the pipeline through a connecting part, and the filtering mechanism is connected with the recovery mechanism. The device can separate, recover and reuse oil mist particles in the air.

10 Claims, 13 Drawing Sheets

(51) Int. Cl.

| | | |
|---|---|---|
| B24B 55/12 | (2006.01) | |
| F01M 13/04 | (2006.01) | |
| B01D 45/16 | (2006.01) | |
| F16C 33/66 | (2006.01) | |
| B01D 50/20 | (2022.01) | |
| B01D 46/00 | (2022.01) | |

(52) U.S. Cl.
CPC ............. *B24B 55/12* (2013.01); *B01D 45/16* (2013.01); *B01D 46/0031* (2013.01); *B01D 50/20* (2022.01); *B01D 2273/30* (2013.01); *F01M 2013/0438* (2013.01); *F16C 33/6662* (2013.01)

(58) Field of Classification Search
CPC ....... B01D 2273/30; F01M 2013/0438; F01M 2013/0466; F16C 33/6662; Y02P 70/10
See application file for complete search history.

(56) References Cited

U.S. PATENT DOCUMENTS

| | | | | |
|---|---|---|---|---|
| 3,062,732 A * | 11/1962 | Keidel | ...................... | F26B 3/34 |
| | | | | 204/278 |
| 3,375,638 A * | 4/1968 | Dungler | .................. | F24F 8/192 |
| | | | | 55/351 |
| 4,153,008 A * | 5/1979 | Marino | ................... | B05B 14/43 |
| | | | | 55/351 |
| 4,221,576 A * | 9/1980 | Phillips, Jr. | ............ | B01D 46/46 |
| | | | | 55/352 |
| 4,378,980 A * | 4/1983 | Long | ..................... | B01D 46/185 |
| | | | | 55/470 |
| 4,405,342 A * | 9/1983 | Bergman | .................. | B03C 3/10 |
| | | | | 55/354 |
| 4,881,957 A * | 11/1989 | Shofner | ................. | B01D 46/46 |
| | | | | 55/352 |
| 5,190,018 A * | 3/1993 | Costello | ................. | F01M 13/04 |
| | | | | 123/573 |
| 5,549,722 A * | 8/1996 | Zemaitis | ................ | B01D 50/20 |
| | | | | 55/463 |
| 5,599,363 A * | 2/1997 | Percy | ..................... | B01D 46/20 |
| | | | | 55/354 |
| 5,912,423 A * | 6/1999 | Doughty | ................... | F24F 8/10 |
| | | | | 95/107 |
| 6,811,685 B2 * | 11/2004 | Wanni | ..................... | B01D 29/09 |
| | | | | 96/429 |
| 6,833,023 B1 * | 12/2004 | Vandenberghe | ....... | B01D 50/20 |
| | | | | 55/498 |
| 7,186,290 B2 * | 3/2007 | Sheehan | ............ | B01D 46/0028 |
| | | | | 55/497 |
| 7,931,718 B2 * | 4/2011 | Cheng | .................... | B01D 45/16 |
| | | | | 96/417 |
| 8,276,650 B2 * | 10/2012 | Martin | ..................... | F01P 11/12 |
| | | | | 165/41 |
| 10,352,239 B2 * | 7/2019 | Brun | ....................... | F02C 7/052 |
| 10,385,746 B2 * | 8/2019 | Zhang | ..................... | F01N 3/027 |
| 11,705,780 B2 * | 7/2023 | Abramov | ............. | B01D 5/0042 |
| | | | | 703/9 |
| 11,815,288 B2 * | 11/2023 | Jung | ......................... | F24F 6/14 |
| 2005/0081495 A1 * | 4/2005 | Wei | ........................ | B01D 46/22 |
| | | | | 55/290 |
| 2006/0042204 A1 * | 3/2006 | Endo | ........................ | B01D 50/20 |
| | | | | 55/337 |
| 2007/0012188 A1 * | 1/2007 | Tandon | .................. | B01D 46/71 |
| | | | | 95/273 |
| 2012/0297740 A1 * | 11/2012 | Cheng | .................... | B01D 50/00 |
| | | | | 55/326 |
| 2013/0327005 A1 * | 12/2013 | Menssen | ............ | B01D 46/2414 |
| | | | | 55/502 |
| 2014/0109337 A1 * | 4/2014 | Krebs | ..................... | A47L 9/127 |
| | | | | 15/353 |
| 2016/0250578 A1 * | 9/2016 | Lee | ....................... | B01D 46/003 |
| | | | | 55/333 |
| 2016/0251987 A1 * | 9/2016 | De Luca | ................. | G01M 3/00 |
| | | | | 123/573 |
| 2017/0362977 A1 * | 12/2017 | Zhang | .................... | B01D 46/84 |
| 2018/0178152 A1 * | 6/2018 | Mitchell | ............ | B01D 46/2411 |
| 2018/0178155 A1 * | 6/2018 | Nicolaou | ............... | B01D 50/20 |
| 2019/0111374 A1 * | 4/2019 | Burton | ............... | F02M 35/0205 |

FOREIGN PATENT DOCUMENTS

| | | | | | |
|---|---|---|---|---|---|
| CN | 104533571 A | * | 4/2015 | | |
| CN | 205308019 U | | 6/2016 | | |
| CN | 105928023 A | * | 9/2016 | ............. | B01D 45/16 |
| CN | 106392764 A | * | 2/2017 | ............. | B05B 15/68 |
| CN | 106437943 A | * | 2/2017 | | |
| CN | 106731415 A | * | 5/2017 | ............. | B01D 45/12 |
| CN | 107185327 A | * | 9/2017 | | |
| CN | 107263225 A | * | 10/2017 | ............. | B24B 41/00 |
| CN | 206597393 U | | 10/2017 | | |
| CN | 107322401 A | * | 11/2017 | | |
| CN | 107823968 A | | 3/2018 | | |
| CN | 207307409 U | | 5/2018 | | |
| CN | 207532945 | * | 6/2018 | | |
| CN | 207532945 U | | 6/2018 | | |
| CN | 207668987 U | | 7/2018 | | |
| CN | 109692772 A | * | 4/2019 | | |
| CN | 109758856 A | * | 5/2019 | ......... | B23Q 11/1046 |
| CN | 109758856 A | | 5/2019 | | |
| CN | 114097841 B | * | 7/2023 | | |
| WO | WO-2017130710 A1 | * | 8/2017 | ............. | B01D 46/00 |

OTHER PUBLICATIONS

Apr. 26, 2020 Written Opinion issued in Intenational Patent Application No. PCT/CN2020/074390.

* cited by examiner

OIL MIST RECOVERY, SEPARATION AND PURIFICATION DEVICE FOR MINIMUM QUANTITY LUBRICANT GRINDING PROCESS

BACKGROUND

Technical Field

The present invention relates to the technical field of grinding equipment, and specifically relates to an oil mist recovery, separation and purification device for a minimum quantity lubricant (MQL) grinding process.

Related Art

At present, grinding occupies an immeasurably important position in machining. Especially, in the context of advocating green processing, the Minimum Quantity Lubricant (MQL) technology between pouring type wet grinding and dry grinding is applied to the field of grinding. The high-pressure air plays the roles of cooling and chip removal, and the lubricating oil adheres to the processing surface of a workpiece to form a layer of protective film which plays an MQL effect. This technology combines the advantages of pouring type grinding and dry grinding, and the lubricating effect is almost the same as that of the traditional pouring type grinding. Lubricants generally use alkyl esters with vegetable oil as base oil, which have the characteristics of excellent biodegradability, lubricating properties, high viscosity index, low volatility, reproducibility, short production cycle, less environmental diffusion and the like. The usage amount of the lubricants is only a few thousandths of that of traditional processing manners, which greatly improves the working environment. This technology is an efficient low-carbon processing technology. In order to improve the cooling effect and the lubricating effect, different nano particles can also be added to the lubricants. In the MQL grinding process, the high-pressure air will enable a part of the atomized lubricants to be scattered around, these atomized lubricants are doped with abrasive dust, and if the nano particles are used, they are also doped with the nano particles, so that oil haze is formed. If workers are exposed to such an environment for a long time, the oil haze inhaled into the body will have a certain impact on body health. After fine particles such as the abrasive dust and the nano particles in the oil haze enter the respiratory tract, they enter the lungs and are difficult to be completely discharged. Over time, they accumulate over a long period of time and cause great damage to the lungs. It may cause airway dysfunction and respiratory diseases in workers. Early studies on allergic pneumonia were not conducted on workers exposed to metal oil mist. However, due to the rapid increase in the number of workers suffering from allergic pneumonia in recent years, the fact that long-term exposure to oil mist can cause pneumonia has been studied and confirmed. Research data on the effect of the metal oil mist on the lung functions of workers is still scarce. One of the reasons is that most of the observable declines in lung function are irreversible. In addition, the decline in lung function is related to the amount of the oil mist exposed, which is a result of long-term accumulation. However, the results of studies with animals as test objects show that dogs exposed to 5-100 mg/m$^3$ of oil mist for more than 12 months will have fatty alveoli and macrophage fatty granulomas, and the respiratory tissues will show morphological changes. If the concentration of the oil mist is too high, it will penetrate into the inside of the machine and adhere to electrical components. When the power is turned on, the components will generate heat. Because the placement of the components is limited in space, serious heat accumulation will burn the motherboard and the machine, and may also cause larger fires. If the concentration of the oil mist is too high, the oil mist adheres to the surface of the machine, which is also a trouble for cleaning.

After searching: Dai Qin invents an oil mist device with a filter (patent number: 201410650610.6), specifically related to an oil mist device with a filter, including a housing and an end cover, wherein the end cover is disposed above the housing, a filter element and an oil drum are disposed inside the housing, the upper part of the oil drum is provided with an oil mist device cover, an air inlet of the oil mist device and an air outlet of the oil mist device are formed in the upper end of the oil mist device cover, a channel is disposed between the air inlet of the oil mist device and the air outlet of the oil mist device, the upper part of the filter element is connected with an end cover, an air inlet and an air outlet are formed in the end cover, the air inlet is communicated with the space outside the filter element inside the housing, an air outlet of the filter element is connected with the air inlet of the oil mist device, and the air outlet of the oil mist device is connected with the air outlet on the end cover. The inventor found that the present invention cannot recover the filtered oil for reuse.

After searching: Zhao Junwu et al. invent an oil mist filter for loudspeaker production (patent number: 201711400817.8), including a filter housing with an air inlet and an air outlet formed in two sides, and a telescopic pipe and an air outlet pipe which are connected with the filter housing, wherein an air restriction pipeline and an air channel are disposed between the air inlet and the air outlet, a mesh filter, a centrifugal impeller, a primary filter, a secondary filter and a tertiary filter are disposed in the air channel, and an auxiliary exhaust fan is disposed in the air outlet pipe. The present invention is simple in structure and reasonable in design. The mesh filter is used to perform primary filtration to adsorb large particles in the surrounding environment, and then, a multi-stage activated carbon filter is used to adsorb and filter harmful substances, so that the environmental quality during loudspeaker production can be greatly improved, and the safety and health of workers can be ensured. The inventors found that the present invention failed to consider the processing, purification and recycling of the filtered oil.

After searching: Song Zhiming invents an oil mist filter (patent number: 201721227764.X), and designs an oil mist filter, including a filter housing, an oil mist suction inlet formed in the end of the filter housing, a shunt mesh disposed on the inner side of the oil mist suction inlet, a primary filter mesh, a wind wheel, a secondary filter mesh, and a motor disposed on the inner side of the secondary filter mesh, wherein an output shaft of the motor is connected with a shaft cover, the shaft cover fixes a leaf handle on the output shaft of the motor, the leaf handle is fixedly connected with the wind wheel, a sealed box is disposed on the upper rear of the filter housing, an activated carbon filter layer housing is disposed above the sealed box, the bottom of the activated carbon filter layer housing is provided with an air flow stabilizing screen, an activated carbon filter layer is disposed above the air flow stabilizing screen, a glass fiber filter layer is disposed above the activated carbon filter layer, and an exhaust screen is disposed above the glass fiber filter layer. The inventor found that the present invention failed to consider the processing of impurities such as oil and abrasive dust separated from the oil haze, and the recycling of oil.

After searching: Ma Changhuan et al. invent a cyclone separation device for an oil mist filter of an air compressor (patent number: 201721027059.5). In the cyclone separation device for the oil mist filter of the air compressor, a barrel-shaped fixed seat is composed of a hollow flat plate and a barrel-shaped vertical plate, a high-pressure oil mist inlet and a low-pressure oil mist inlet which are opposite are formed in the barrel-shaped vertical plate, the upper side of the middle of the hollow flat plate is provided with a hollow cylinder opposite to a through hole of the hollow flat plate, the lower side of the middle of the hollow flat plate is provided with a hollow cyclone cylinder opposite to the through hole of the hollow flat plate, an annular blade fixing plate is disposed on the hollow cyclone cylinder at a position opposite to and lower than the oil mist inlet, a plurality of oblique blades with the same oblique direction are uniformly inserted in the circumferential direction on the annular fixing plate, and the oblique direction of the oblique blades is opposite to the direction of the high-pressure oil mist inlet. The inventors found that the present invention failed to consider the processing of impurities such as oil and abrasive dust separated from the oil haze, and the recycling of oil.

The inventors found that there is no device or method for recovering and separating the oil mist generated in an MQL grinding process, and then processing and purifying the recovered and separated oil mist so as to reuse the purified lubricating fluid.

SUMMARY

In order to overcome the above defects in the prior art, the present invention provides an oil mist recovery, separation and purification device for a minimum quantity lubricant (MQL) grinding process, which can recover, separate and purify the oil mist generated in the grinding process, can realize the reuse of the oil, meets the requirements of green manufacturing and processing, is beneficial to the body health of operators, and prolongs the service life of the grinding equipment.

To achieve the above objective, the following technical solutions are used in the present invention:

An oil mist recovery, separation and purification device for a minimum quantity lubricant (MQL) grinding process includes:

a pneumatic separation mechanism, configured to separate oil mist and particles in the air and including a pipeline and a fan fixedly connected with one end of the pipeline, wherein the fan is configured to form a negative pressure in the pipeline, at least one cone-shaped filter mesh mechanism is disposed in the pipeline, a tip of the cone-shaped filter mesh mechanism faces the side of an air inlet direction of the pipeline, and the cone-shaped filter mesh mechanism is configured to separate the oil mist and particles in the air; and a filtering and recovery mechanism, connected with the pipeline, configured to filter and recover the oil mist separated by the pneumatic separation mechanism, and including a case body, a filtering mechanism and a recovery mechanism, wherein the case body is connected with the pipeline through a connecting part, the filtering mechanism is configured to filter the separated oil mist, the filtering mechanism is connected with the recovery mechanism, and the recovery mechanism is configured to recover oil filtered by the filtering mechanism.

By disposing the fan, the air can be driven to flow from one end in the pipeline and be discharged from an air outlet of the fan. By disposing the cone-shaped filter mesh mechanism, the oil mist and particles in the circulating air inside the pipeline can be separated to make the discharged air clean. By disposing the filtering and recovery device, the oil mist droplets and particles separated by the cone-shaped filter mesh can be filtered and recovered, thereby meeting the requirements of green manufacturing and processing.

Further, the pipeline is an L-shaped pipeline and includes a horizontal part and a vertical part, the horizontal part is configured to be connected with the filtering and recovery mechanism through the connecting part, and an end of the vertical part is connected with a fan.

Further, the cone-shaped filter mesh mechanism includes a mounting ring, the mounting ring is fixed with a cone-shaped filter mesh, a plurality of mounting grooves are formed in the mounting ring, and the mounting ring is clamped and fixedly connected by the mounting grooves and clamping blocks disposed on an inner surface of the pipeline.

By using the mounting grooves and the clamping blocks for clamping and fixing, it is convenient to disassemble the cone-shaped filter mesh mechanism and clean grinding particles on the cone-shaped filter mesh.

Further, the pipeline is connected with pressure detection devices configured to detect an air pressure in the pipeline.

Further, the filtering mechanism includes an electromagnetic plate, filter paper and an oil box, the electromagnetic plate is disposed inside the connecting part and is configured to adsorb metal grinding particles, the filter paper is disposed inside the case body and is configured to filter the oil mist passing through the electromagnetic plate, the oil box is configured to collect the oil filtered by the filter paper, the oil box is connected with the recovery mechanism, and the oil is recovered and reused through the recovery mechanism.

Further, one end of filter paper is wound on a filter paper tube rotationally connected with a case wall of the case body, the filter paper tube is configured to wind an unused part of the filter paper, the other end of the filter paper is configured to be connected with a filter paper storage device, and the filter paper storage device is configured to store a used part of the filter paper.

Further, rollers are further disposed in the case body, and the rollers are configured to tension the filter paper part between the filter paper tube and the filter paper storage device.

Further, an upper part of the oil box is connected with a mesh frame, and the mesh frame is configured to support the filter paper part above the oil box.

Further, the filter paper storage device includes a storage tube, the storage tube is connected with a driving mechanism, the driving mechanism is configured to drive the rotation of the storage tube, a rolling tube is disposed inside the storage tube, an end of one side of the rolling tube is rotationally connected with an end of the same side of the storage tube, an axis of the rolling tube and an axis of the storage tube are not located on the same straight line, a paper inlet parallel to the axis of the storage tube is formed in a tube wall of the storage tube, the paper inlet is located at a position of the minimum distance between cylindrical surfaces of an inner tube surface of the storage tube and an outer tube surface of the rolling tube, a gap is formed in a tube wall of the rolling tube, an end of the filter paper is capable of extending into the inside of the rolling tube through the paper inlet and the gap, and the minimum distance between the cylindrical surfaces of the inner tube surface of the storage tube and the outer tube surface of the rolling tube meets the requirement that the inner tube surface of the storage tube is capable of compressing the filter paper together with the outer tube surface of the rolling tube.

The end of the filter paper extends into the inside of the rolling tube, the rolling tube rotates, the outer tube surface of the rolling tube and the inner tube surface of the storage tube compress the filter paper, the storage tube rotates, and then, the filter paper can be wound on the outer tube surface of the storage tube.

Further, the recovery mechanism includes an oil cup fixed on the outside of the case body, the oil cup is connected with one end of an oil pipe, and the other end of the oil pipe extends into the inside of the case body and is connected with the oil box.

The present invention has the following beneficial effects:

In the oil mist recovery, separation and purification device of the present invention, the cone-shaped filter mesh mechanism is used to separate the oil mist and particles in the air, and the filtering and recovery mechanism is used to filter and recover the separated oil mist to realize the reuse of the oil, thereby meeting the requirements of green manufacturing and processing, making the air in the grinding space cleaner and fresher, being more beneficial to the health of operators, preventing the grinding equipment from being contaminated by oil stain, making the working environment better, guaranteeing the quality of the product, and also improving the efficiency.

BRIEF DESCRIPTION OF THE DRAWINGS

The accompanying drawings constituting a part of the present application are used for providing further understanding for the present application. Exemplary embodiments of the present application and descriptions thereof are used for explaining the present application and do not constitute a limitation to the present application.

1. L-shaped pipe, 1-1. horizontal pipe, 1-2. vertical pipe, 2. first straight pipe, 3. second straight pipe, 4. fan, 5. cone-shaped filter mesh mechanism, 5-1. mounting ring, 5-1-1. mounting groove, 5-2. filter mesh, 6. clamping block, 7. pressure sensor, 8. first connecting pipe, 9. case body, 10. second connecting pipe, 11. case cover, 12. electromagnetic plate, 13. filter paper, 14. oil box, 15. filter paper tube, 16. storage tube, 17. servo motor, 18. sealing ring, 19. key, 20. rolling tube, 21. connecting shaft, 22. lug boss, 23. spacer bush, 24. paper inlet, 25. gap, 26. rotating plate, 27. roller, 28. roller connecting plate, 29. connecting rod, 30. mesh frame, 30-1. support leg, 30-2. metal mesh, 31. oil cup, 32. oil cup support, 33. first oil pipe, and 34. second oil pipe.

DETAILED DESCRIPTION

It should be noted that the following detailed descriptions are all exemplary and are intended to provide a further understanding of the present application. Unless otherwise specified, all technical and scientific terms used herein have the same meaning as commonly understood by a person of ordinary skill in the art to which the present application belongs.

It should be noted that terms used herein are only for describing specific implementations and are not intended to limit exemplary implementations according to the present application. As used herein, the singular form is intended to include the plural form, unless the context clearly indicates otherwise. In addition, it should further be understood that the terms "comprise" and/or "include" used in this specification indicate that there are features, steps, operations, devices, components, and/or combinations thereof.

For convenience of description, the words "upper", "lower", "left" and "right", if exist in the present invention, only indicate upper, lower, left and right directions consistent with those of the accompanying drawings, are not intended to limit the structure, and are used only for ease of description of the present invention and brevity of description, rather than indicating or implying that the mentioned device or element needs to have a particular orientation or needs to be constructed and operated in a particular orientation. Therefore, such terms should not be construed as a limitation on the present invention.

As described in the related art, at present, there is no device or method for recovering and separating the oil mist generated in an MQL grinding process, and then processing and purifying the recovered and separated oil mist so as to reuse the purified lubricating fluid. In view of the above problems, the present application proposes an oil mist recovery, separation and purification device for an MQL grinding process.

Figure 1:
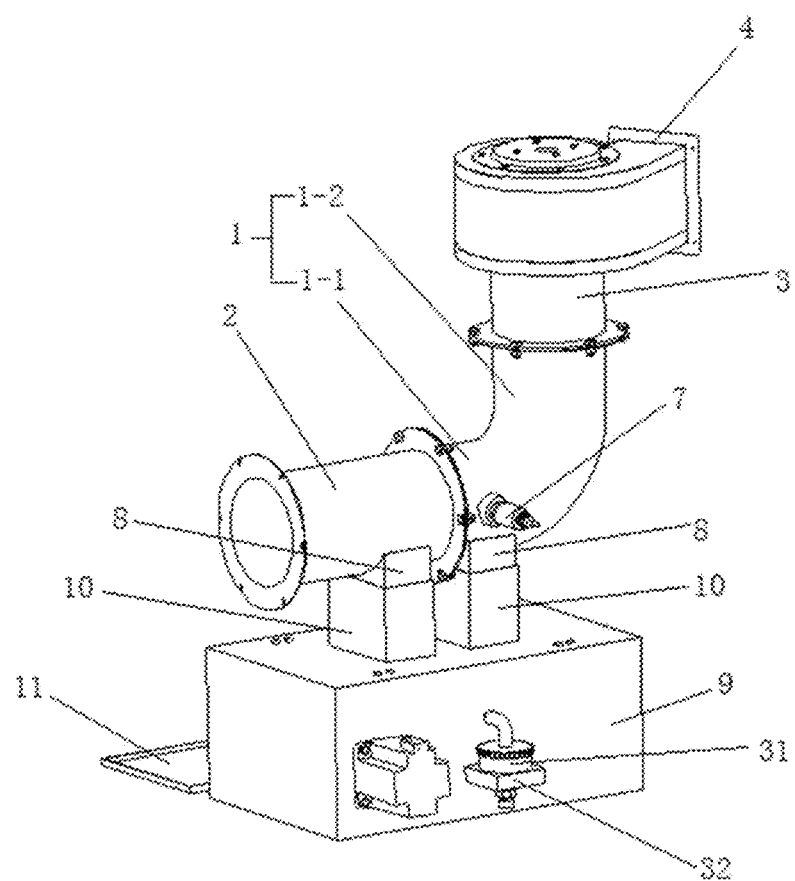
FIG. 1 is a schematic view of an overall structure according to an embodiment of the present invention.
Figure 2:
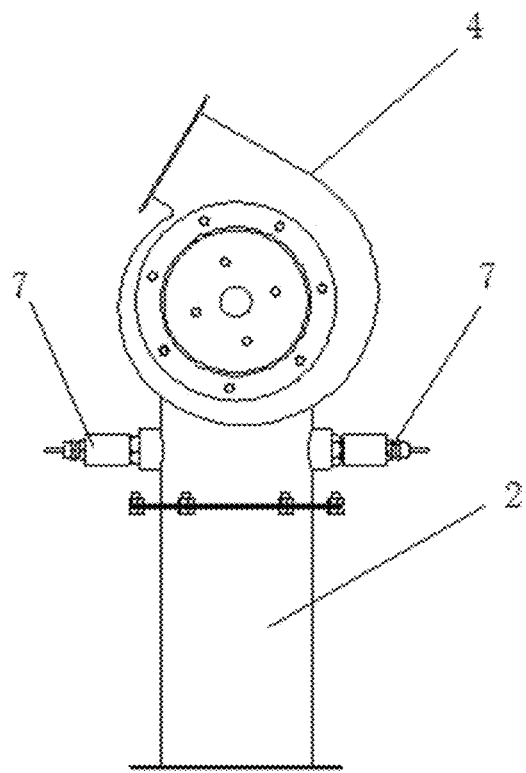
FIG. 2 is a schematic top view of assembly of a pipeline and a fan according to an embodiment of the present invention.
Figure 3:
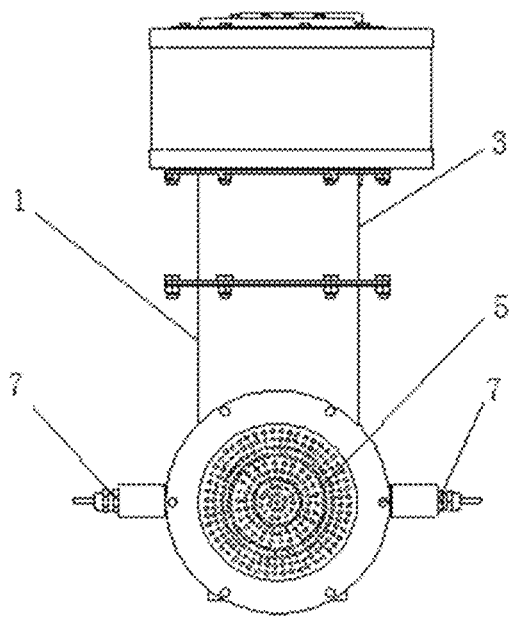
FIG. 3 is a schematic side view of assembly of the pipeline and the fan according to an embodiment of the present invention.
Figure 4:
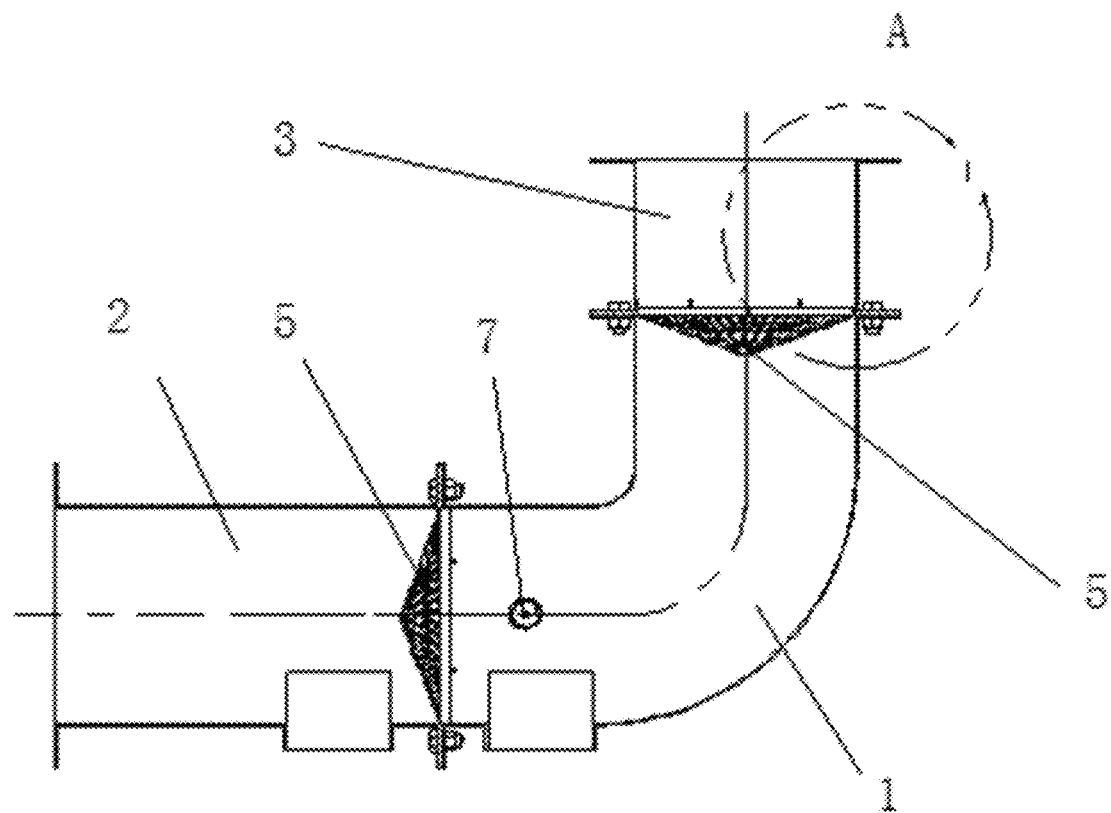
FIG. 4 is a schematic view of assembly of cone-shaped filter mesh mechanisms and the pipeline according to an embodiment of the present invention.
Figure 5:
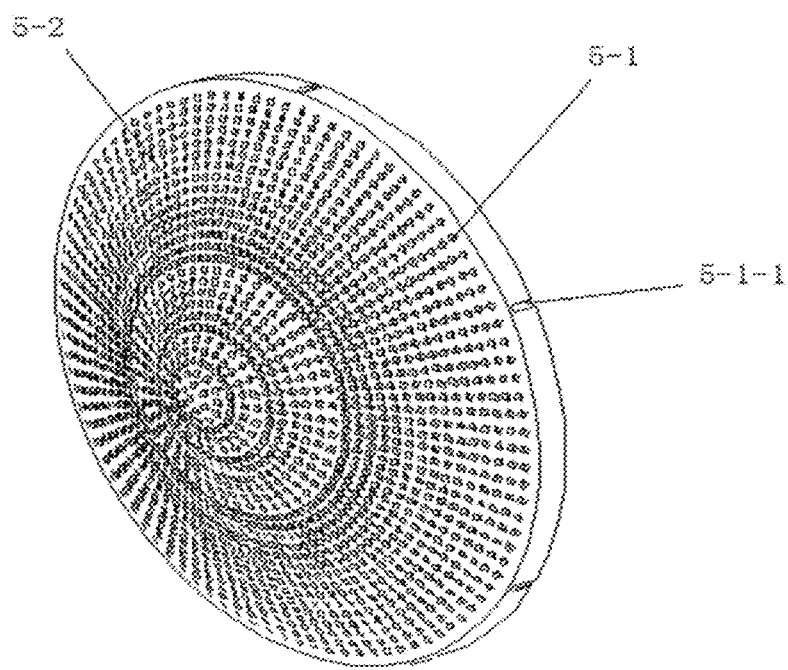
FIG. 5 is a schematic structural view of the cone-shaped filter mesh mechanism according to an embodiment of the present invention.
Figure 6:
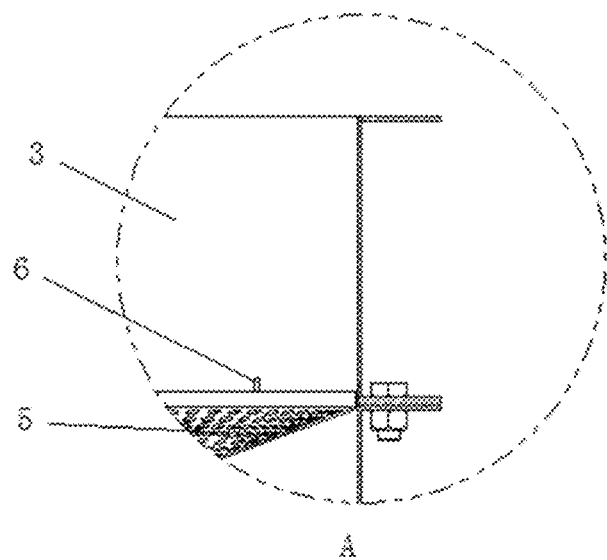
FIG. 6 is an enlarged view of a part A in FIG. 4 of the present invention.
Figure 7:
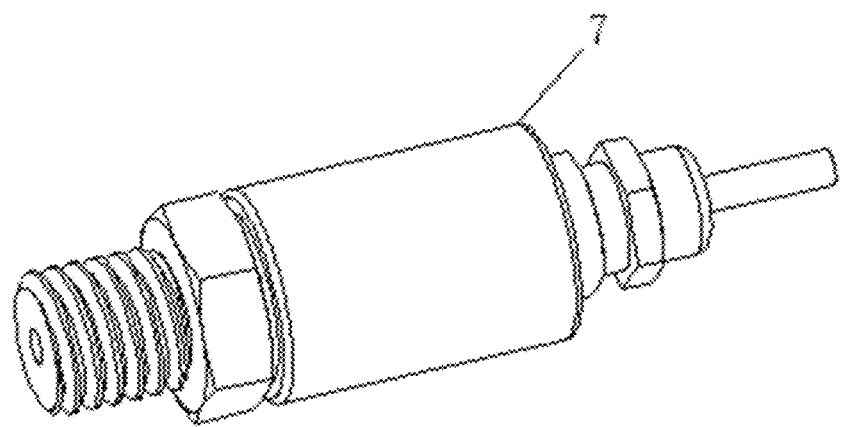
FIG. 7 is a schematic structural view of a pressure sensor according to an embodiment of the present invention.
Figure 8:
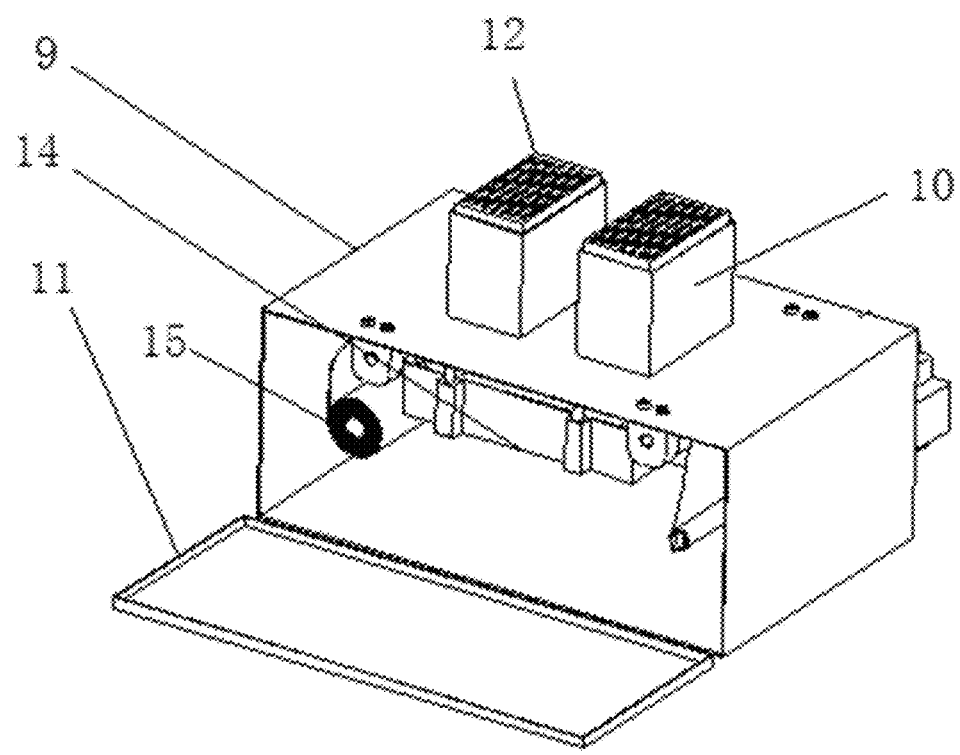
FIG. 8 is a schematic structural view of a filtering and recovery mechanism according to an embodiment of the present invention.
Figure 9:
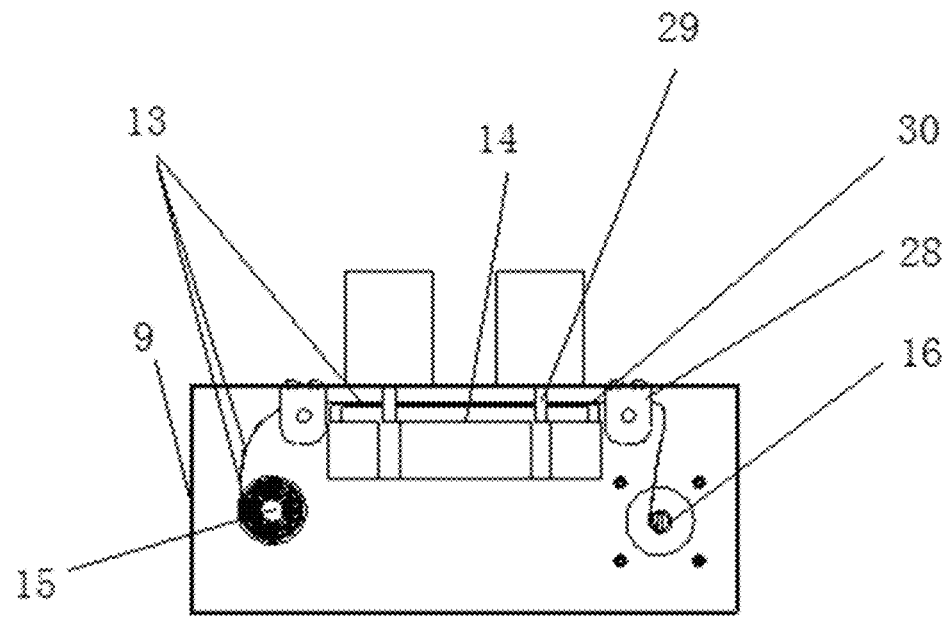
FIG. 9 is a schematic front view of the filtering and recovery mechanism according to an embodiment of the present invention.
Figure 10:
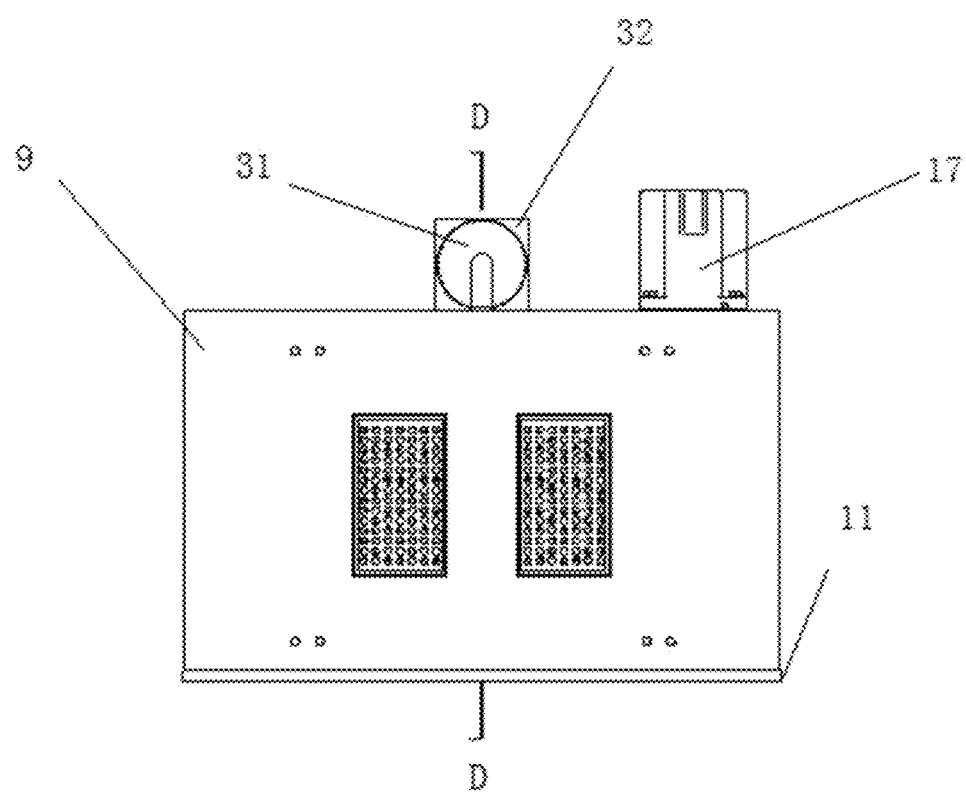
FIG. 10 is a schematic top view of the filtering and recovery mechanism according to an embodiment of the present invention.
Figure 11:
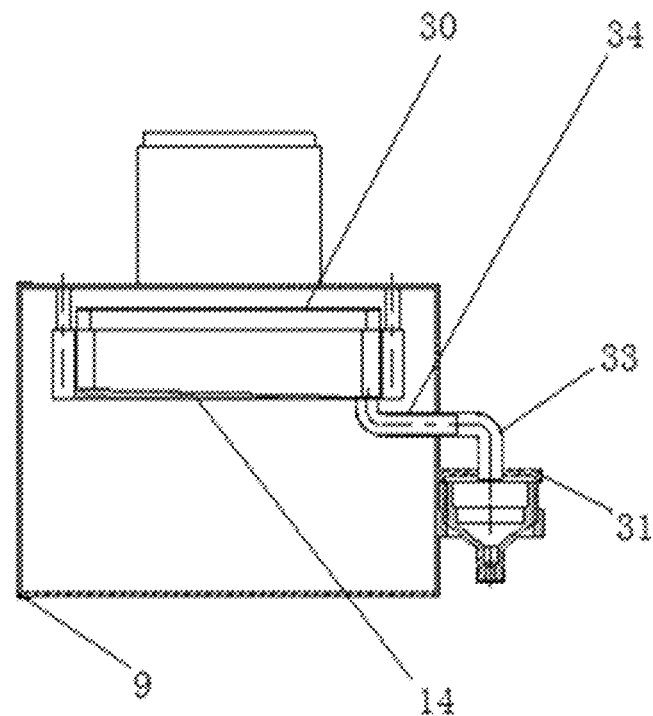
FIG. 11 is a schematic view of a D direction in FIG. 10 of the present invention.
Figure 12:
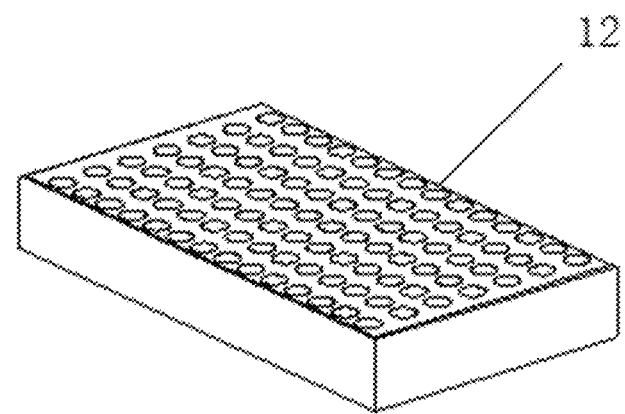
FIG. 12 is a schematic structural view of an electromagnetic plate according to an embodiment of the present invention.
Figure 13:
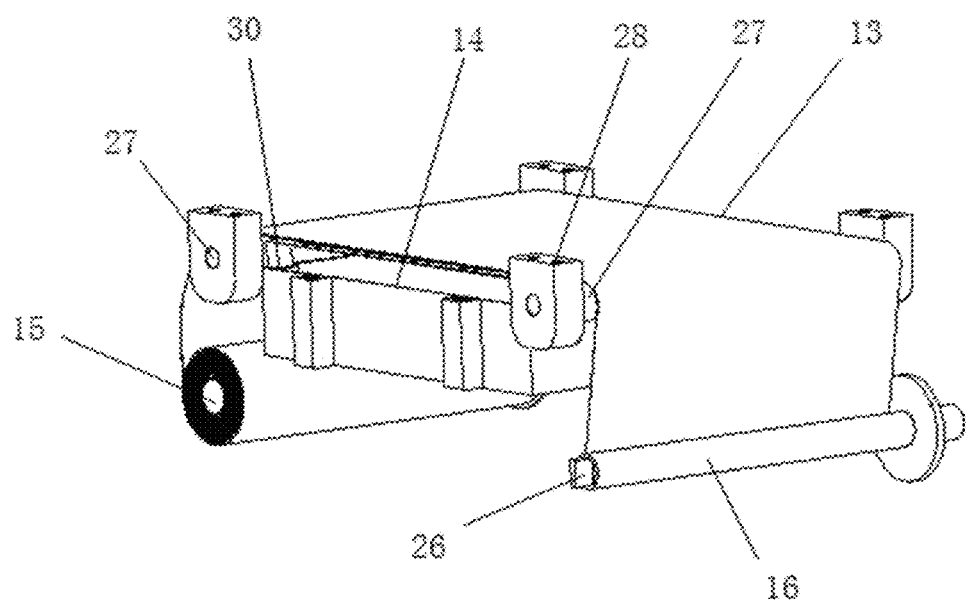
FIG. 13 is a schematic structural view of a filtering mechanism according to an embodiment of the present invention.
Figure 14:
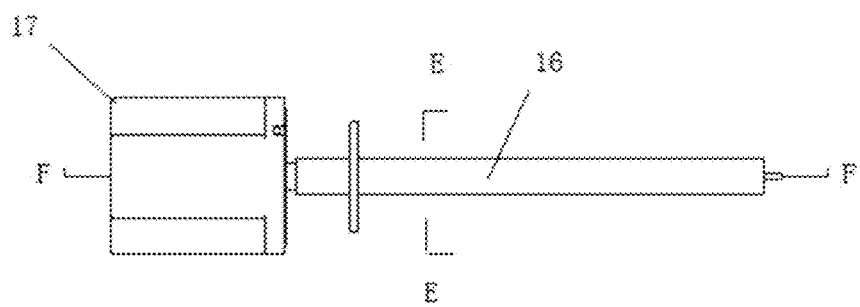
FIG. 14 is a schematic structural view of a filter paper storage device according to an embodiment of the present invention.
Figure 15:
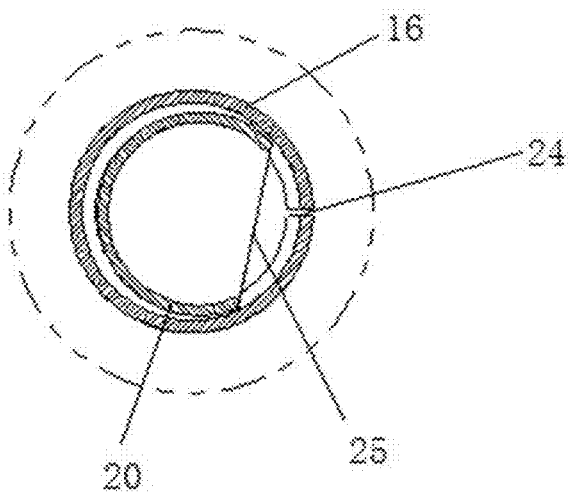
FIG. 15 is a schematic view of an E direction in FIG. 14 of the present invention.
Figure 16:
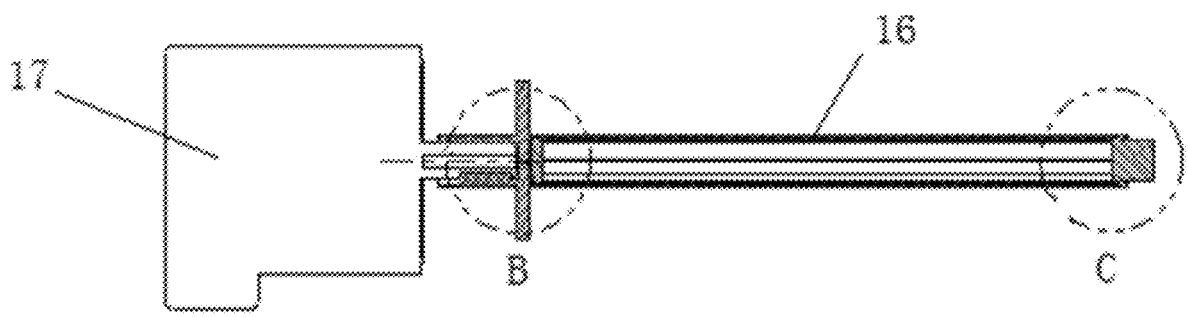
FIG. 16 is a schematic view of an F direction in FIG. 14 of the present invention.
Figure 17:
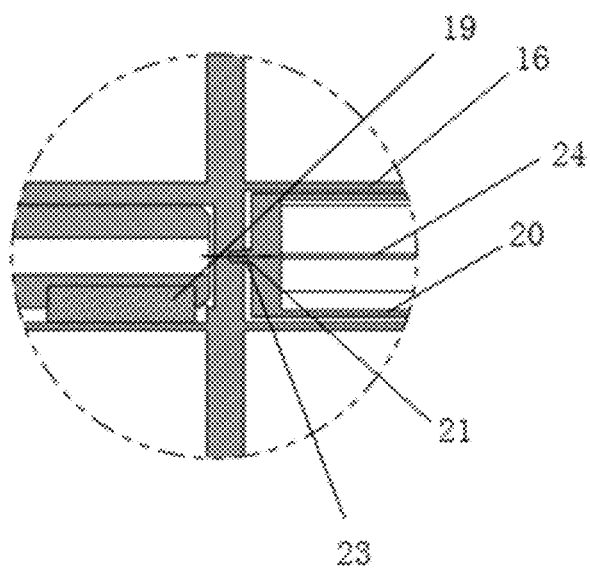
FIG. 17 is an enlarged view of a part B in FIG. 16 of the present invention.
Figure 18:
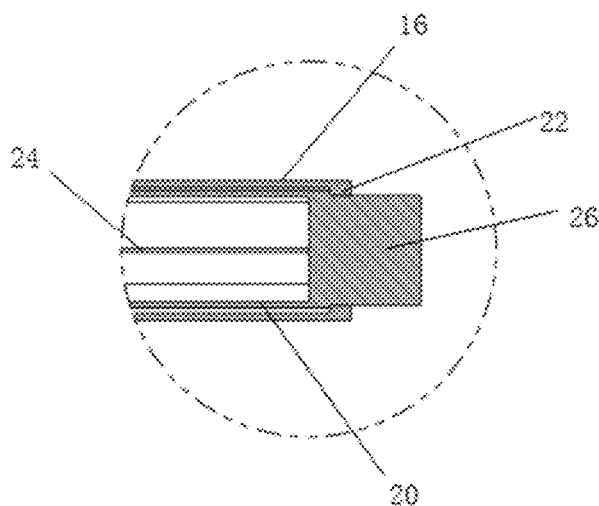
FIG. 18 is an enlarged view of a part C in FIG. 16 of the present invention.
Figure 19:
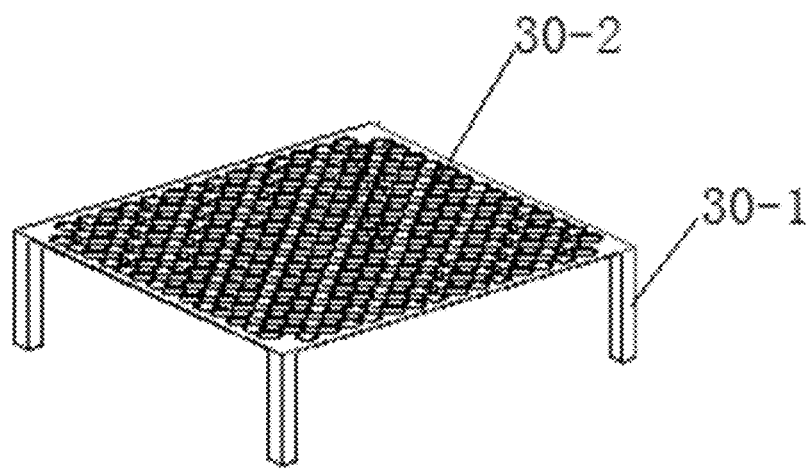
FIG. 19 is a schematic structural view of a mesh frame according to an embodiment of the present invention.
Figure 20:
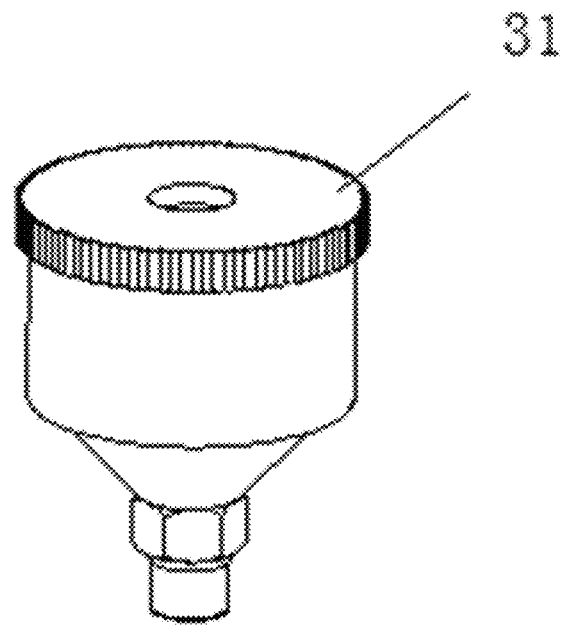
FIG. 20 is a schematic structural view of an oil cup according to an embodiment of the present invention.
Figure 21:
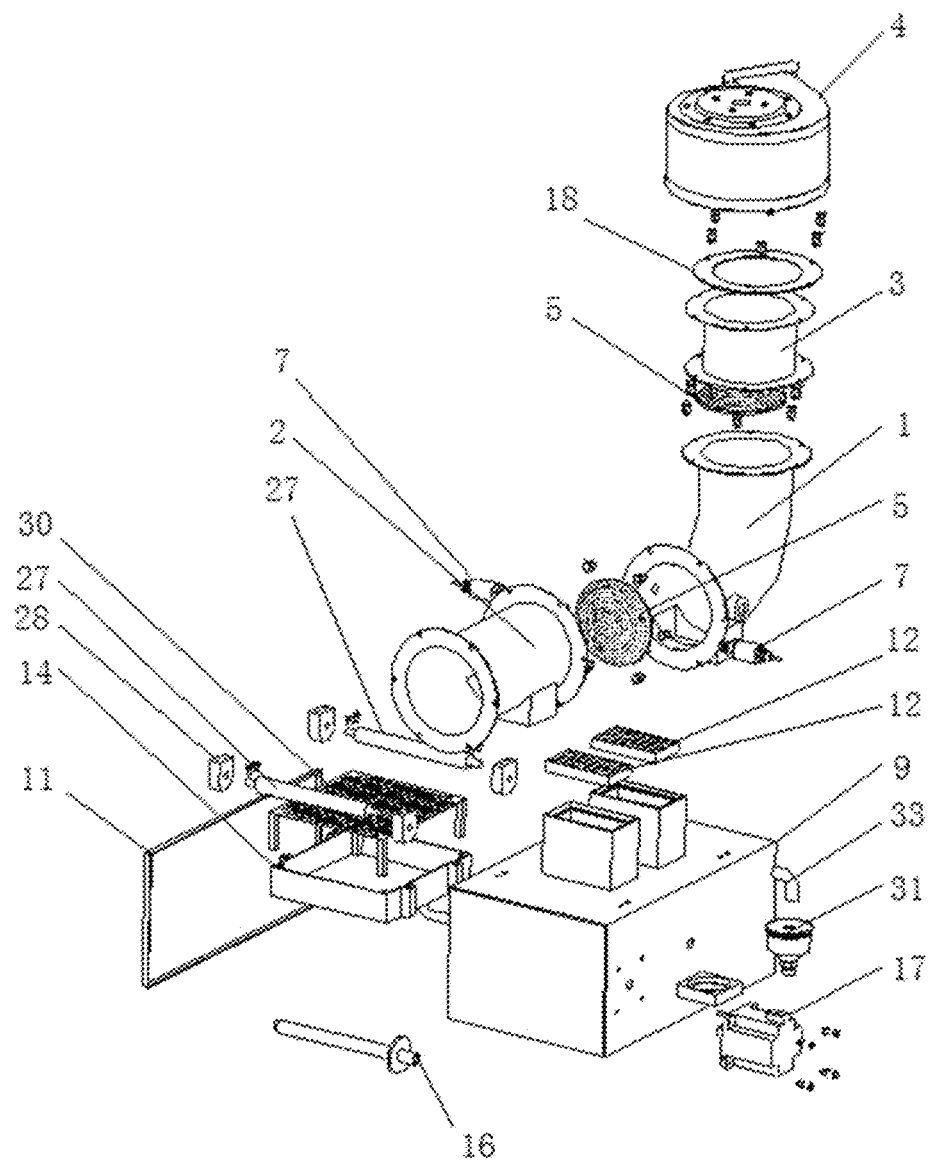
FIG. 21 is an explosive schematic structural view of the overall structure according to an embodiment of the present invention.

In a typical embodiment of the present application, as shown in FIG. 1 to FIG. 21, an oil mist recovery, separation and purification device for an MQL grinding process includes:

a pneumatic separation mechanism configured to separate oil mist and particles in the air. The pneumatic separation mechanism includes a pipeline, the pipeline is L-shaped and includes an L-shaped pipe 1 which is composed of a horizontal pipe 1-1 and a vertical pipe 1-2, and a first straight pipe 2 and a second straight pipe 3 which are located at two ends of the L-shaped pipe. The horizontal pipe of the L-shaped pipe is connected with the end of the first straight pipe through a flange structure, a bolt and a nut. The vertical pipe of the L-shaped pipe is connected with the end of the second straight pipe through a flange structure, a bolt and a nut. The horizontal pipe of the L-shaped pipe and the first straight pipe constitute a horizontal part of the pipeline. The vertical pipe of the L-shaped pipe and the second straight pipe constitute a vertical part of the pipeline. The end of the first straight pipe is used as an air inlet. The top end of the second straight pipe is fixed with a fan 4 through screws and sealed by a sealing ring 18. The fan adopts a single-stage centrifugal fan. The air pressure provided by the single-stage centrifugal fan is relatively large. The centrifugal effect of the single-stage centrifugal fan can separate the residual particles in the air flowing through the pipeline, and at the same time, a negative pressure can be generated in the pipeline.

Two cone-shaped filter mesh mechanisms 5 are mounted in the pipeline. A tip of the cone-shaped filter mesh mechanism faces the side of an air inlet direction. One of the cone-shaped filter mesh mechanisms is mounted at the end of the connecting end of the horizontal pipe of the L-shaped pipe and the first straight pipe. The other cone-shaped filter mesh mechanism is mounted at the end of the connecting end of the second straight pipe and the vertical pipe. The cone-shaped filter mesh mechanism includes a circular mounting ring 5-1. The mounting ring is fixed with a cone-shaped filter mesh 5-2. Six mounting grooves 5-1-1 are formed in the mounting ring. The inner surfaces of the horizontal pipe and the second straight pipe are provided with clamping blocks 6 matched with the mounting grooves. The clamping blocks are clamped into the mounting grooves, so that the clamped and fixed connection between the cone-shaped filter mesh mechanism and the pipeline can be realized. The cone-shaped filter mesh mechanism is convenient to disassemble from the pipeline, so that impurity particles on the cone-shaped filter mesh are convenient to clean. By using two cone-shaped filter mesh mechanisms disposed in the L-shaped pipeline, the air passes through one of the cone-shaped filter mesh mechanisms and then passes through the other cone-shaped filter mesh mechanism through the L-shaped pipe, so that the condensation and separation time of the oil mist can be effectively prolonged, and the separation efficiency of the oil mist can be improved.

An impeller of the fan exerts a dynamic effect on the air during rotation to increase the pressure and speed of the air in the pipeline, so that when the air passes through the cone-shaped filter mesh mechanism at a high speed, the direction changes instantaneously, a vortex is generated around the cone-shaped filter mesh mechanism, the particles in the air collide at a high speed and form a negative pressure, the temperature decreases, the oil mist and other particles in the air are separated, and the clean air is discharged from the air outlet of the fan along the pipeline under the effect of a centrifugal force.

The diameter of the mesh hole of the cone-shaped filter mesh is 0.2 cm, the area of the mesh hole reaches 0.0314 $cm^2$, there are multiple rows of mesh holes, each row of mesh holes is evenly distributed along the circumference, and an included angle formed between the center of two adjacent circular holes on the same circumference and the center of the top end of the cone-shaped filter mesh is 3.75°. The mesh holes are evenly and densely distributed so as to increase the air inlet area. By using the principle of aerodynamics, the air resistance is reduced, the static air pressure is reduced, the air intake speed is increased, the air volume is increased, and the air intake is smoother. The cone angle of the cone-shaped filter mesh is 22°, which realizes the optimal resistance coefficient and enables the oil droplets inside and outside the cone-shaped filter mesh mechanism to slide down smoothly.

Two pressure detection devices are in threaded connection with the horizontal pipe of the L-shaped pipe symmetrically, and the pressure detection device adopts a pressure sensor 7. The pressure sensors are configured to detect the pressure in the pipeline to obtain the volume of the oil mist in the pipeline, and wind power generated by the fan can be adjusted according to the obtained pressure information so as to improve the separation efficiency of the oil mist.

The horizontal pipe and the first straight pipe are respectively provided with a square first connecting pipe 8, and the first connecting pipe is configured to be connected with the filtering and recovery mechanism.

The filtering and recovery mechanism includes a case body 9, a filtering mechanism and a recovery mechanism. The top of the case body is provided with two second connecting pipes 10, and the second connecting pipe and the first connecting pipe are in inserted connection. The first connecting pipe and the second connecting pipe constitute a connecting part for connecting the pipeline with the case body, and the communication between the pipeline and the internal space of the case body is realized through the connecting part. A case cover 11 is disposed on a case wall at one side of the case body, and components in the case body can be conveniently overhauled and maintained after the case cover is opened.

The filtering mechanism includes an electromagnetic plate 12, filter paper 13 and an oil box 14 fixed inside the second connecting pipe.

The electromagnetic plate is configured to adsorb metal grinding particles, and a filter paper tube and a filter paper storage device are respectively disposed in the case body on two sides below the connected position of the second connecting pipe and the case wall of the top of the case body.

The filter paper tube 15 is rotationally connected with the case wall of the case body, the filter paper is wound on the filter paper tube, and the filter paper tube is configured to wind the unused part of the filter paper.

The filter paper storage device includes a storage tube 16. The storage tube is connected with a driving mechanism located outside the case body. The driving mechanism adopts a servo motor 17. A motor casing of the servo motor is fixed on the case wall of the case body. An output shaft of the servo motor extends into the inside of the case body and is connected with the storage tube through a key 19. The servo motor can drive the rotation of the storage tube. A rolling tube 20 is disposed inside the storage tube. One end of the rolling tube is provided with a connecting shaft 21 and is rotationally connected with the end of the same side of the storage tube through the connecting shaft. An axis of the rolling tube and an axis of the storage tube are not located on the same straight line, and two ends of the rolling tube are limited and fixed by a lug boss 22 disposed at the end of the storage tube and a spacer bush 23 on the connecting shaft. A paper inlet 24 parallel to the axis of the storage tube is formed in a tube wall of the storage tube. The paper inlet is located at a position of the minimum distance between cylindrical surfaces of an inner tube surface of the storage tube and an outer tube surface of the rolling tube. The minimum distance between the cylindrical surfaces of the inner tube surface of the storage tube and the outer tube surface of the rolling tube meets the requirement that the inner tube surface of the storage tube is capable of compressing the filter paper together with the outer tube surface of the rolling tube. A gap 25 is formed in a tube wall of the rolling tube. An end of the filter paper is capable of extending into the inside of the rolling tube through the paper inlet and the gap. The end of the rolling tube on the side where the lug boss is located is provided with a rotating plate 26 which extends to the outside of the storage tube, and the rotating plate is used to facilitate an operator to rotate the rolling tube.

Rollers 27 are respectively disposed above the filter paper tube and the storage tube, two ends of the rollers are rotationally connected with a roller connecting plate 28, the roller connecting plate is connected with the case wall of the top of the case body through bolts, and the rollers are configured to tension the filter paper between the filter paper tube and the storage tube.

When in use, the movable end of the filter paper is stretched, the rollers are used to tension the filter paper, the movable end of the filter paper is extended into the inside of the rolling tube through the paper inlet and the gap, and then, the rotating plate is used to rotate the rolling tube, so that the outer tube surface of the rolling tube and the inner tube surface of the storage tube compress the filter paper, and the connection between the filter paper and the filter paper storage device is realized.

An oil box is disposed below the filter paper part between the filter paper tube and the filter paper storage device, the oil box is connected with the case wall of the top of the case body through a connecting rod 29, a mesh frame 30 is placed at the top of the oil box, the mesh frame includes four support legs 30-1 and a metal mesh 30-2 fixed at the top ends of the support legs, and the mesh frame is configured to support the filter paper.

The oil flowing through the electromagnetic plate falls on the filter paper, the filter paper further filters the oil, the filtered oil falls into the oil box through the metal mesh, and the oil box collects the filtered oil.

The oil box is connected with the recovery mechanism, the recovery mechanism is configured to recover the oil in the oil box, the recovery mechanism includes an oil cup 31 located outside the case body, the oil cup is placed on an oil cup support 32, the oil cup support is fixedly connected with the case wall of the case body, the oil cup is connected with the oil box through a first oil pipe 33, a second oil pipe 34 and an oil outlet on the oil box, the oil outlet is located on the bottom surface of the oil box, and the bottom surface of the oil box is an inclined surface. The oil outlet is located at a position with a low height on the bottom surface of the oil box, so as to facilitate the outflow of the oil.

In the present embodiment, the pressure sensor, the fan and the servo motor are all connected with a control device, and the control device controls their works.

When the present embodiment works, the case cover is opened in advance, the movable end of the filter paper is connected with the filter paper storage device, then the case cover is closed, the fan is started, the fan generates a negative pressure in the pipeline, the air flows in from the air inlet of the first straight pipe and is discharged through the air outlet of the fan, the air flows through two cone-shaped filter mesh mechanisms when flowing in the pipeline, the cone-shaped filter mesh mechanisms use the vortex generated by the air around the filter meshes and the inertial collision of the particles to gather the oil mist into oil droplets so as to separate the oil mist and abrasive dust, the air discharged from the air outlet of the fan is clean air, the grinding particles fall into the inside of the second connecting pipe through the first connecting pipe, the oil mist falls into the inside of second connecting pipe through the first connecting pipe in the form of droplets, the electromagnetic plate inside the second connecting pipe adsorbs and fixes the metal grinding particles, the oil mist droplets pass through the electromagnetic plate and fall on the filter paper, the filter paper further filters the oil mist droplets, the filtered oil passes through the metal mesh of the mesh frame and falls into the oil box, and the filtered oil flows into the oil cup through the first oil pipe and the second oil pipe via the oil outlet at the bottom of the oil box, so that the oil can be recovered and reused.

After the filter paper is used for a period of time, the servo motor drives the storage tube to rotate, the used part of the filter paper is wound on the outer circumference of the storage tube, and the new part of the filter paper is used for filtering again.

The oil mist recovery, separation and purification device of the present embodiment is suitable for machining fields such as semi-closed grinding machines, closed grinding machines and milling machines, and not only separates the oil mist in machining processes but also purifies the separated oil mist, so that the oil mist can be reused so as to meet the requirements of green manufacturing and processing. The device makes the air in the processing space cleaner and fresher, thereby being more beneficial to the health of workers. The surface of the machine is free of oil stain, thereby prolonging the service life of the machine. The working environment is better, the quality of the product is further guaranteed, and the efficiency is also improved.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. An oil mist recovery, separation and purification device for a minimum quantity lubricant (MQL) grinding process, the device comprising:
    a pneumatic separation mechanism, configured to separate oil mist and particles in air and comprising a pipeline and a fan fixedly connected with one end of the pipeline, wherein the fan is configured to form a negative pressure in the pipeline, at least one cone-shaped filter mesh mechanism is disposed in the pipeline, a tip of the cone-shaped filter mesh mechanism faces a side of an air inlet direction of the pipeline, and the cone-shaped filter mesh mechanism is configured to separate the oil mist and particles in air; and a filtering and recovery mechanism, connected with the pipeline, configured to filter and recover the oil mist separated by the pneumatic separation mechanism, and comprising a case body, a filtering mechanism and a recovery mechanism, wherein the case body is connected with the pipeline through a connecting part, the filtering mechanism is configured to filter separated oil mist, the filtering mechanism is connected with the recovery mechanism, and the recovery mechanism is configured to recover oil filtered by the filtering mechanism.

2. The oil mist recovery, separation and purification device for an MQL grinding process according to claim 1, wherein the pipeline is an L-shaped pipeline and comprises a horizontal part and a vertical part, the horizontal part is configured to be connected with the filtering and recovery mechanism through the connecting part, and an end of the vertical part is connected with the fan.

3. The oil mist recovery, separation and purification device for an MQL grinding process according to claim 1, wherein the cone-shaped filter mesh mechanism comprises a mounting ring, the mounting ring is fixed with a cone-shaped filter mesh, a plurality of mounting grooves are formed in the mounting ring, and the mounting ring is clamped and fixedly connected by the mounting grooves and clamping blocks disposed on an inner surface of the pipeline.

4. The oil mist recovery, separation and purification device for an MQL grinding process according to claim 1, wherein the pipeline is connected with pressure detection devices configured to detect an air pressure in the pipeline.

5. The oil mist recovery, separation and purification device for an MQL grinding process according to claim 1, wherein the filtering mechanism comprises an electromagnetic plate, filter paper and an oil box, the electromagnetic plate is disposed inside the connecting part and is configured to adsorb metal grinding particles, the filter paper is disposed inside the case body and is configured to filter the oil mist passing through the electromagnetic plate, the oil box is configured to collect the oil filtered by the filter paper, the oil box is connected with the recovery mechanism, and the oil is recovered and reused through the recovery mechanism.

6. The oil mist recovery, separation and purification device for an MQL grinding process according to claim 1, wherein one end of filter paper is wound on a filter paper tube rotationally connected with a case wall of the case body, the filter paper tube is configured to wind an unused part of the filter paper, the other end of the filter paper is configured to be connected with a filter paper storage device, and the filter paper storage device is configured to store a used part of the filter paper.

7. The oil mist recovery, separation and purification device for an MQL grinding process according to claim 6, wherein rollers are further disposed in the case body, and the rollers are configured to tension a filter paper part between the filter paper tube and the filter paper storage device.

8. The oil mist recovery, separation and purification device for an MQL grinding process according to claim 6, wherein an upper part of an oil box is connected with a mesh frame, and the mesh frame is configured to support a filter paper part above the oil box.

9. The oil mist recovery, separation and purification device for an MQL grinding process according to claim 6, wherein the filter paper storage device comprises a storage tube, the storage tube is connected with a driving mechanism, the driving mechanism is configured to drive the rotation of the storage tube, a rolling tube is disposed inside the storage tube, an end of one side of the rolling tube is rotationally connected with an end of a same side of the storage tube, an axis of the rolling tube and an axis of the storage tube are not located on the same straight line, a paper inlet parallel to the axis of the storage tube is formed in a tube wall of the storage tube, the paper inlet is located at a position of the minimum distance between cylindrical surfaces of an inner tube surface of the storage tube and an outer tube surface of the rolling tube, a gap is formed in a tube wall of the rolling tube, an end of the filter paper is capable of extending into the inside of the rolling tube through the paper inlet and the gap, and the minimum distance between the cylindrical surfaces of the inner tube surface of the storage tube and the outer tube surface of the rolling tube meets the requirement that the inner tube surface of the storage tube is capable of compressing the filter paper together with the outer tube surface of the rolling tube.

10. The oil mist recovery, separation and purification device for an MQL grinding process according to claim 5, wherein the recovery mechanism comprises an oil cup fixed on the outside of the case body, the oil cup is connected with one end of an oil pipe, and the other end of the oil pipe extends into the inside of the case body and is connected with the oil box.

* * * * *